United States Patent

Chundury et al.

[11] Patent Number: 5,601,889
[45] Date of Patent: *Feb. 11, 1997

[54] RADIO FREQUENCY WELDABLE POLYMER ARTICLES

[75] Inventors: Deenadayalu Chundury, Newburgh, Ind.; Rajeev S. Bhatia, Willington, Conn.

[73] Assignee: Ferro Corporation, Cleveland, Ohio

[ * ] Notice: The term of this patent shall not extend beyond the expiration date of Pat. No. 5,274,035.

[21] Appl. No.: 310,810

[22] Filed: Sep. 22, 1994

Related U.S. Application Data

[63] Continuation-in-part of Ser. No. 890,759, May 29, 1992, abandoned.

[51] Int. Cl.$^6$ ............... B32B 27/08; B32B 27/32; B32B 27/30; B32B 1/08
[52] U.S. Cl. ............ 428/34.3; 428/34.7; 428/35.2; 428/35.7; 428/500; 428/515; 428/870; 428/522; 428/523; 525/55; 525/88; 525/89; 525/90; 525/95; 525/222; 525/237; 525/240; 525/241; 525/302; 525/418; 156/73.1
[58] Field of Search .................. 525/55, 88, 222, 525/237, 240, 241, 89, 90, 302, 418, 95; 156/73.1; 428/34.3, 34.7, 35.2, 35.7, 500, 515, 520, 522, 523

[56] References Cited

U.S. PATENT DOCUMENTS

| | | | |
|---|---|---|---|
| 4,636,412 | 1/1987 | Field | 428/35 |
| 4,997,083 | 3/1991 | Loretti et al. | 206/219 |
| 5,042,176 | 8/1991 | Rudy | 36/29 |
| 5,100,721 | 3/1992 | Akao | 428/218 |
| 5,135,785 | 8/1992 | Millon | 428/35.2 |
| 5,274,035 | 12/1993 | Chundury | 525/92 |

FOREIGN PATENT DOCUMENTS

| | | |
|---|---|---|
| 2031675 | 12/1990 | Canada . |
| 232171A2 | 2/1987 | European Pat. Off. . |
| 247580A2 | 5/1987 | European Pat. Off. . |
| 295204A1 | 6/1988 | European Pat. Off. . |
| 437152A1 | 12/1990 | European Pat. Off. . |
| 444954A2 | 3/1991 | European Pat. Off. . |
| 9216358 | 10/1992 | WIPO . |

OTHER PUBLICATIONS

Database WPI 85–287890 "Blood bag having excellent strength, flexibility, etc.–is made of addn. polymerised silicon rubber inner layer and polymer blend outer layer".
European Search Report EP 93 91 2095.

*Primary Examiner*—Paul J. Thibodeau
*Assistant Examiner*—Mary Critharis
*Attorney, Agent, or Firm*—Renner, Otto, Boisselle & Sklar

[57] ABSTRACT

This invention relates to a polymer article prepared by the process comprising the steps of: (1) blending polymer composition comprising (A) at least one ethylene vinyl acetate copolymer, (B) at least one propylene ethylene copolymer, and (C) (1) from about 0.01% to about 5% by weight of a cross-linking agent, (2) from about 0.1% to about 35% by weight of one or more polymers selected from: (i) at least one co-, or terpolymer of at least one vinyl aromatic compound; (ii) at least one co-, or terpolymer of an alpha-olefin, and at least one monomer selected from the group consisting of an acrylic acid, an acrylic ester, a vinyl silane, and a vinyl alcohol; (iii) at least one polyolefin other than a propylene homopolymer or a propylene-ethylene copolymer; (iv) at least one polyetheramide block copolymer; (v) at least one ionomer; (vi) at least one oxidized polyolefin wax, or mixtures of (1) and (2); and forming the polymer composition into the article. This invention also relates to articles such as bags, pouches, tubing, closures, etc. The polymer articles of the present invention can be used to form a variety of medical parts with good mechanical properties. The polymer articles are RF weldable and have a low specific gravity, allowing down-gauging and improved processing relative to PVC. In addition, the polymer articles are sterilizable by a wide variety of methods including steam, gamma, ethylene oxide and E-beam techniques, as well as possessing high contact and see-through clarity and excellent barrier properties. These polymer films are halogen free. The articles do not produce toxic or corrosive chemicals upon incineration. Thus, these articles do not pose an environmental disposal problem.

15 Claims, No Drawings

RADIO FREQUENCY WELDABLE POLYMER ARTICLES

This is a continuation-in-part of application Ser. No. 07/890,759 filed on May 29, 1992, now abandoned

FIELD OF THE INVENTION

This invention relates to polymer articles containing ethylene vinyl acetate, articles made therefrom and compositions for making them. These articles may be joined by radio frequency welding.

BACKGROUND

Thermoplastics have been widely used in the formation of medical parts for which excellent design, performance, and volume capabilities are required. For example, the use of plastics in the formation of packaging for physiologic solutions is well known in the medical field. They are usable whenever transparent and flexible packages, such as infusion-solution bags and blood bags, are needed.

In order to be useful in medical applications, a thermoplastic must meet various criteria. The plastics intended for packaging physiologic solutions must be inexpensive and easy to manufacture, must not react with the components of physiologic solutions, and must not leach additives into physiologic solutions. Their permeability to water-vapor, air and other gases must be low, their resistance to heat, radiation and ethylene oxide must be high since they are subjected to sterilization. Medical plastics also must be sealable by well-established methods (e.g., by radio frequency ("RF"), ultrasonics or the like), and they must withstand mechanical stresses common to medical environments.

One resin that has been used successfully in medical environments is poly(vinyl chloride) ("PVC"). The relevant art prior to and the subsequent development of this material as a medical plastic is reviewed in R. N. Burgess, ed., *Manufacture and Processing of PVC*, Macmillan Publishing Co., Inc., New York, 1982.

While PVC provides significant benefits, it is subject to certain drawbacks and disadvantages. Most notably, PVC requires a considerable proportion of plasticizers in order to make the material flexible and aid sealability. The tendency of the softeners and plasticizers to diffuse, leach or migrate from medical packaging made from such materials naturally limits their application.

Another deficiency of PVC is its tendency, under cold conditions common to storing physiologic materials, to loose flexibility and impact resistance. This can result in an undesirably high proportion of package breakages during transit and distribution. Also, infusion-solution bags made from softened PVC are often susceptible to degradation by atmospheric oxygen and microorganisms which can lead to additional package breakages.

Prior to the present invention, alternatives to PVC for medical packaging have been developed and used with varying degrees of success. Japanese Patent 86-002096 describes a packaging material consisting of foam prepared from a mixture containing an ethylene-vinyl acetate ("EVA") copolymer having 20–50 mole percent vinyl acetate and also containing an olefin resin such as polypropylene. The packaging material contains from 0.5–0.2 to 1 weight percent EVA.

U.K. Application 2,177,974 describes a packaging material which is a laminate having: (1) an inner layer of RF energy absorbent material such as EVA having a vinyl acetate content of at least 15%; (2) a first "heat-sealable" outer layer on one side of layer (1) comprising EVA having a vinyl acetate content of less than 15%; and (3) a second outer layer on the adjacent side of layer (1) which is suitably comprised of high-density polyethylene.

Canadian Patent 835,467 describes EVA compositions having improved thermal resistance which contain up to about 15% vinyl acetate and up to about 25% of (1) polypropylene; or (2) a mixture of polypropylene and high-density polyethylene. The compositions are suitable for medical applications such as packets for surgical instruments and containers for intravenous fluids.

There continues to be a need for cost effective alternatives to PVC that are useful in medical applications.

SUMMARY OF THE INVENTION

This invention relates to a polymer article prepared by the process comprising the steps of: (1) blending polymer composition comprising (A) at least one ethylene vinyl acetate copolymer, (B) at least one propylene ethylene copolymer, and (C) (1) from about 0.01% to about 5% by weight of a cross-linking agent, (2) from about 0.1% to about 35% by weight of one or more polymers selected from: (i) at least one co-, or terpolymer of at least one vinyl aromatic compound; (ii) at least one co-, or terpolymer of an alpha-olefin, and at least one monomer selected from the group consisting of an acrylic acid, an acrylic ester, a vinyl silane, and a vinyl alcohol; (iii) at least one polyolefin other than a propylene homopolymer or a propylene-ethylene copolymer; (iv) at least one polyetheramide block copolymer; (v) at least one ionomer; (vi) at least one oxidized polyolefin wax, or mixtures of (1) and (2); and forming the polymer composition into the article. This invention also relates to articles such as bags, pouches, tubing, closures, etc.

The polymer articles of the present invention can be used to form a variety of medical parts with good mechanical properties. The polymer articles are RF weldable and have a low specific gravity, allowing down-gauging and improved processing relative to PVC. In addition, the polymer articles are sterilizable by a wide variety of methods including steam, gamma, ethylene oxide and E-beam techniques, as well as possessing high contact and see-through clarity and excellent barrier properties. These polymer articles are halogen free. In one embodiment, the article formed from the polymer blend is a monolayer article. The articles do not produce toxic or corrosive chemicals upon incineration. Thus, these articles do not pose an environmental disposal problem.

DETAILED DESCRIPTION

As described herein the polymer articles are RF weldable. The articles may be produced by extrusion, molding, such as injection molding, and thermalforming techniques. The articles may form closures which are often used to form a seal for prepared foods, such as frozen foods. The closure may also form the top or bottom of a plastic bottle. In a preferred embodiment, the article is a film and is useful in forming bags and pouches.

The polymer articles comprise a mixture of components as described in more detail herein. An essential component of the blended polymer compositions of the present invention is (A) at least one ethylene-vinyl acetate copolymer.

(A) Ethylene-Vinyl Acetate Copolymer

The ethylene-vinyl acetate (EVA) copolymer may be any ethylene-vinyl acetate copolymer useful in preparing the polymer articles as described herein. The copolymers may be prepared by any known means such as free radical polymerization. Many ethylene-vinyl acetate copolymers are available commercially. The EVA generally contains at least about 5% by weight of vinyl acetate, generally, from about 5% to about 50% by weight of vinyl acetate. In one embodiment, ethylene-vinyl acetate copolymers have vinyl acetate contents from about 10%, or about 15%, or about 25% up to about 40%, or about 20% by weight. Ethylene vinyl acetate copolymers having a vinyl acetate content of 19% are particularly useful.

In general, the ethylene vinyl acetate copolymers have a melt flow range from about 0.1 to about 150 g/10 min., preferably about 0.1 to about 10 g/10 min., more preferably about 0.1 to about 2 g/10 min.

The preparation of the EVA copolymers may be carried out according to known methods. A typical method of preparing EVA copolymers is found in U.S. Pat. No. 3,506,630 which is incorporated herein by reference. Another method of preparing EVA copolymers is described in U.S. Pat. No. 3,325,460 which is also incorporated by reference. The ethylene-vinyl acetate copolymers used in the present invention are generally present in a major amount (i.e., greater than 50% by weight of the composition). The ethylene-vinyl acetate copolymer may be present in an amount greater than 55%, or 60% by weight of the polymer composition. In the polymer compositions, the exact amount of ethylene vinyl acetate copolymer is dependent on the amount of additional polymers (discussed below) included in the polymer mixture. In these embodiments, it is understood that the ethylene vinyl acetate copolymers comprise the balance of the polymer composition. The ethylene-vinyl acetate copolymers used in the present invention are available commercially and are known to those skilled in the art. Examples of commercially available ethylene-vinyl acetate copolymers include Elvax 265, 3120, and 3165 available commercially from DuPont Chemical Company, USI 643 and 631 available commercially from Quantum Chemical Company, and Exxon 6D720.62 available commercially from Exxon Chemical.

(B) Propylene Ethylene Copolymer

One of the polymers of the polymer composition is (B) at least one propylene homopolymer or at least one copolymer of propylene and ethylene. Examples of propylene homopolymers include Shell PP5A97 (40 melt flow index (MFI)), Shell PP5C12 (17 MFI), Amoco PP7644 (24 MFI), Genesis AP2PP26P (12 MFI), and Himount PropX G523 (4 MFI).

In another embodiment, (B) is a copolymer of propylene and ethylene. (B) generally contains from about 1%, or about 4%, up to about 30%, or to about 20%, or to about 15% by weight ethylene. In one embodiment, (B) is a block copolymer of propylene and ethylene. In this embodiment, (B) contains from about 4%, or about 8%, or about 10% up to about 30%, or to about 25%, or to about 20%, or to about 15% by weight ethylene. In another embodiment, (B) is a random copolymer of ethylene and propylene. In this embodiment, (EI) generally contains from about 1%, or about 4% to about 10%, or about 7% by weight of ethylene. In one embodiment, the ethylene content is about 6% by weight. In another embodiment, the ethylene content is from about 3% to about 4% by weight.

Processes useful in preparing the propylene ethylene copolymers useful in preparing the present invention are well known to those skilled in the art and many such copolymers are available commercially. Such random copolymers may be prepared by any of a number of methods known in the art including those set forth in the *Encyclopedia of Polymer Science & Engineering*, Volume 13, 2nd edition, Wiley & Sons, pp. 500-et seq. (and footnotes cited therein), which is fully incorporated by reference herein. Propylene ethylene copolymers useful in the present invention are available commercially. Examples of these copolymers include Fina Y-8573 (containing about 3% to about 4% by weight of ethylene) and Z-7650 available from Fina Oil and Chemical Company, Dallas, Tex., U.S.A, Solrex 4208 available from Soltex Polymer Corporation, Houston, Tex., U.S.A., and Shell WR D6-281 available from Shell Chemical Company, Houston, Tex., U.S.A.

The propylene ethylene copolymers are used in the present invention in an amount from about 15%, or about 20%, or about 25%, or about 30% up to about 60%, or about 50%, or about 40% by weight of the polymer composition.

(C) Additional Additives and/or Polymers

The polymer compositions additionally include (C) (1) from about 0.01% to about 5% by weight of a cross-linking agent, (2) from about 0.1% to about 35% by weight of one or more polymers selected from: (i) at least one co-, or terpolymer of at least one vinyl aromatic compound; (ii) at least one co-, or terpolymer of an alpha-olefin, and at least one monomer selected from the group consisting of an acrylic acid, an acrylic ester, a vinyl silane, and a vinyl alcohol; (iii) at least one polyolefin other than a propylene homopolymer or a propylene-ethylene copolymer; (iv) at least one polyetheramide block copolymer,; (v) at least one ionomer; (vi) at least one oxidized polyolefin wax or mixtures of (1) and (2); and extruding the polymer composition into the article. The polymers may be used individually or in combination.

In one embodiment, the polymer composition includes a cross-linking agent. The cross-linking agent is used in an effective amount to provide cross-linking. In one embodiment, the cross-linking agent is present in an amount greater than about 0.020%, or about greater than 0.025%, or about 0.030% by weight of the polymer composition. The cross-linking agent may be used in an amount up to about 5%.

In one embodiment, the cross-linking agent is an organic peroxide. The organic peroxide is generally present in an amount greater than about 0.005%, or about 0.01% by weight of the polymer compositions. In one embodiment, the organic peroxide is present in an amount from about 0.020%, or about 0.025%, or about 0.030% to about 5%, or about 2%, or about 1% by weight of the polymer composition. Examples of organic peroxides include: organic peroxy compounds such as dialkyl peroxides (e.g., diethyl peroxide); alkyl hydrogen peroxides (e.g., tert-butyl hydrogen peroxide; diacyl peroxides; and mixed diacyl peroxides). A particularly useful organic peroxide is bis(t-butylperoxy(2,5, dimethyl))hexane. This dialkyl peroxide is available as a 5 weight percent concentrate from Polyvel Corporation under the tradename CR-05. Other free radical generators include ultraviolet rays, gamma rays, electron beams, etc.

The cross-linking agent may also be a maleimide. The maleimide contain greater than 2, preferably from 2, or 3, up to about 8, or about 6 maleimide groups. In one embodiment, the maleimide is oligomeric. Examples of useful maleimides include bismaleimide and tetramaleimide cross-linking agents.

Polymers of Vinyl Aromatic Compounds

The blended polymer compositions of the present invention at least one co-, or terpolymer of a vinyl aromatic compound. The polymers may also be graft co-, or terpolymers. The copolymers include polymers of the vinyl aromatic compound and one or more copolymerizable monomers such as unsaturated dicarboxylic acid reagent including the acids, anhydrides, imides, metal salts and partial esters of said acids; acrylic acids and esters; acrylonitriles; dienes, such as butadiene; etc. The terpolymers include polymers of the vinyl aromatic compound with two or more monomers including dienes, acrylonitrile, acrylic acids and esters, etc. Preferably the polymer composition of the invention comprises from about 0.1%, or about 0.5%, or about 1%, or about 5% to about 35%, or to about 25% by weight of the co-, or terpolymer (i). In one embodiment, the co-, or terpolymer (i) is present in an amount from about 0.1%, or about 0.5%, or about 1% to about 15%, or to about 10% by weight of the polymer compositions. In another embodiment, the co-, or terpolymer (i) is present in an amount from about 15%, or about 20% to about 30%, or to about 25% by weight of the polymer composition.

Block Copolymers

One of the polymers of the vinyl aromatic compound is at least one block copolymer of a vinyl aromatic hydrocarbon and a conjugated diene. The block copolymer may also be selectively hydrogenated.

The vinyl aromatic compounds include styrene and the various substituted styrenes which is represented by the following formula

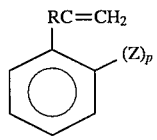

wherein R is hydrogen, an alkyl group containing from 1 to about 6 carbon atoms, or halogen; Z is a member selected from the group consisting of vinyl, halogen and alkyl groups containing from 1 to about 6 carbon atoms; and p is a whole number from 0 up to the number of replaceable hydrogen atoms on the phenyl nucleus. Specific examples of vinyl aromatic compounds such as represented by the above formula include, for example, in addition to styrene, alpha-methylstyrene, beta-methylstyrene, vinyltoluene, 3-methylstyrene, 4-methylstyrene, 4-isopropylstyrene, 2,4-dimethylstyrene, o-chlorostyrene, p-chlorostyrene, o-bromostyrene, 2-chloro-4-methylstyrene, etc. Styrene is the preferred vinyl aromatic compound.

Examples of vinyl aromatic hydrocarbons include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc. The preferred vinyl aromatic hydrocarbon is styrene.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl- 1,3-butadiene, chloroprene, 1,3-pentadiene, 1,3-hexadiene, etc. Mixtures of these conjugated dienes also may be used. The preferred conjugated dienes are isoprene and 1,3-butadiene.

The block copolymers of vinyl aromatic hydrocarbons and conjugated dienes which may be utilized in the polymer blends of the present invention include any of those which exhibit elastomeric properties and those which have 1,2-microstructure contents from about 7% to about 100%. In one embodiment, 35% to 50% of the condensed conjugated diene units have a 1,2-configuration. The block copolymers may be diblock, triblock, multiblock, starblock, polyblock or graftblock copolymers. Throughout this specification and claims, the terms diblock, triblock, multiblock, polyblock, staxblock, and graft or grafted-block with respect to the structural features of block copolymers are to be given their normal meaning as defined in the literature, such as in the Encyclopedia of Polymer Science and Engineering, Vol. 2, (1985) John Wiley & Sons, Inc., New York, pp. 325–326, and by J. E. McGrath in *Block Copolymers, Science Technology*, Dale J. Meier, Ed., Harwood Academic Publishers, 1979, at pages 1–5.

Such block copolymers may contain various ratios of conjugated dienes to vinyl aromatic compounds including those containing up to about 60% by weight of vinyl aromatic compounds. Accordingly, multi-block copolymers may be utilized which are linear or radial symmetric or asymmetric and which have structures represented by the formulae A-B, A-B-A, A-B-A-B, B-A-B, $(AB)_{0,1,2} \ldots$ BA, etc., wherein A is a polymer block of a vinyl aromatic compound or a conjugated diene/vinyl aromatic compound tapered copolymer block, and B is a polymer block of a conjugated diene.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Many of the above-described copolymers of conjugated dienes and vinyl aromatic compounds are commercially available. The number average molecular weight of the block copolymers, prior to hydrogenation, is from about 20,000 to about 500,000, preferably from about 40,000 to about 300,000.

The average molecular weights of the individual blocks within the copolymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 450,000 and more preferably from about 35,000 to 150,000.

Also, the vinyl content of the conjugated diene portion is from about 10 to about 80%, and the vinyl content is preferably from about 25 to about 65%, particularly 35 to 55% when it is desired that the modified block copolymer exhibit rubbery elasticity. The vinyl content of the block copolymer can be measured by means of nuclear magnetic resonance.

Specific examples of diblock copolymers include styrene-butadiene, styrene-isoprene, and the hydrogenated derivatives thereof. Examples of triblock polymers include styrene-butadiene-styrene, styrene-isoprene-styrene, alpha-methylstyrene-butadiene-alpha-methylstyrene, and alpha-methylstyrene-isoprene-alpha-methylstyrene.

The selective hydrogenation of the above block copolymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block copolymers which are carried out in a manner and to extent as to produce selectively hydrogenated copolymers having a residual unsaturation content in the polydiene block of from about 0.5 to about 20% of their original unsaturation content prior to hydrogenation.

In one embodiment, the conjugated diene portion of the block copolymer is at least 90% saturated and more often at least 95% saturated while the vinyl aromatic portion is not significantly hydrogenated. Particularly useful hydrogenated block copolymers are the hydrogenated block copolymers of styrene-isoprene-styrene, such as an (ethylene/propylene)-styrene block polymer. When a polystyrene-polybutadiene-polystyrene block copolymer is hydrogenated, it is desirable that the 1,2-polybutadiene to 1,4-polybutadiene ratio in the polymer is from about 30:70 to about 70:30. When such a block copolymer is hydrogenated, the resulting product resembles a regular copolymer block of ethylene and 1-butene (EB). As noted above, when the conjugated diene employed as isoprene, the resulting hydrogenated product resembles a regular copolymer block of ethylene and propylene (EP). One example of a commercially available selectively hydrogenated is KRATON® G-1652 which is a hydrogenated SBS triblock comprising 30% styrene end blocks and a midblock equivalent is a copolymer of ethylene and 1-butene (EB). This hydrogenated block copolymer is often referred to as SEBS.

In another embodiment, the selectively hydrogenated block copolymer is represented by the formula $$B_n(AB)_oA_p$$

wherein n=0 or 1; o is 1 to 100; p is 0 or 1;

each B prior to hydrogenation is predominantly a polymerized conjugated diene hydrocarbon block having a number average molecular weight of about 20,000 to about 450,000; and each A is predominantly a polymerized vinyl aromatic compound block having a number average molecular weight of from about 2000 to about 115,000; the blocks of A constituting about 5% to about 95% by weight of the copolymer; and the unsaturation of the block B is less than about 10% of the original unsaturation. In other embodiments, the unsaturation of block B is reduced upon hydrogenation to less than 5% of its original value, and the average unsaturation of the hydrogenated block copolymer is reduced to less than 20% of its original value.

Grafted Block Copolymers

The co-, or terpolymer (i) of the vinyl aromatic compound may also be a product obtained by grafting an alpha,beta-unsaturated monocarboxylic or dicarboxylic acid reagent onto the selectively hydrogenated block copolymers described above.

The block copolymers of the conjugated diene and the vinyl aromatic compound are grafted with an alpha,beta-unsaturated monocarboxylic or dicarboxylic acid reagent.

The carboxylic acid reagents include carboxylic acids per se and their functional derivatives such as anhydrides, imides, metal salts, esters, etc., which are capable of being grafted onto the selectively hydrogenated block copolymer. The grafted polymer will usually contain from about 0.2 to about 20%, and preferably from about 0.1 to about 10% by weight based on the total weight of the block copolymer and the carboxylic acid reagent of the grafted carboxylic acid.

In one embodiment, the alpha,beta-unsaturated monocarboxylic acid reagents are carboxylic acids corresponding to the formula $$RCH{=}C(R_1)COOH$$

wherein R is hydrogen or a saturated aliphatic or alicyclic, aryl, alkaryl or heterocyclic group. Preferably, R is hydrogen or an alkyl group containing from 1 to about 10 carbon atoms. $R_1$ is hydrogen or an alkyl group containing from 1 to about 10 carbon atoms. The total number of carbon atoms in R and $R_1$ should not exceed 18 carbon atoms. Specific examples of useful monobasic carboxylic acids include acrylic acid, methacrylic acid, cynamic acid, crotonic acid, acrylic anhydride, sodium acrylate, calcium acrylate and magnesium acrylate, etc. Examples of dicarboxylic acids and useful derivatives thereof include maleic acid, maleic anhydride, fumaric acid, mesaconic acid, itaconic acid, citraconic acid, itaconic anhydride, citraconic anhydride, monomethyl maleate, monosodium maleate, etc.

In order to promote the grafting of the carboxylic acid reagent to the hydrogenated block copolymer, free radical initiators are utilized, and these initiators usually are either peroxides of various organic compounds. The amount of initiator utilized generally from about 0.01% to about 5% by weight based on the combined weight of the combined copolymer and the carboxylic acid reagent. The amount of carboxylic acid reagent grafted onto the block copolymers can be measured by determining the total acid number of the product. The grafting reaction can be carried out by melt or solution mixing of the block copolymer and the carboxylic acid reagent in the presence of the free radical initiator.

The preparation of various selectively hydrogenated block copolymers of conjugated dienes and vinyl aromatic compounds which have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. No. 4,795,782 describes and gives examples of the preparation of the grafted block copolymers by the solution process and the melt process. U.S. Pat. No. 4,578,429 contains an example of grafting of KRATON® G1652 (SEBS) polymer with maleic anhydride with 2,5-dimethyl-2,5-di(t-butylperoxy) hexane by a melt reaction in a twin screw extruder. (See Col. 8, lines 40–61.)

Examples of commercially available maleated selectively hydrogenated copolymers of styrene and butadiene include Kraton® FG1901X from Shell, often referred to as a maleated selectively hydrogenated SEBS copolymer.

In another embodiment, the co-, or terpolymer (i) of a vinyl aromatic compound is a copolymer or terpolymer of a vinyl aromatic compound and an unsaturated carboxylic acid reagent; acrylic acid and ester; or an acrylonitrile.

The unsaturated carboxylic acid reagents include unsaturated mono- and dicarboxylic acid reagent. The monocarboxylic acid reagents include those described above. In one embodiment, the monocarboxylic acid reagents include acrylic esters.

The acrylic esters are characterized by the formula

wherein R is hydrogen, or an alkyl group containing 1 to 4 carbon atoms such as a methyl or ethyl group, and R' is an alkyl group containing from 1 to about 6 carbon atoms. Specific examples of esters characterized by the above formula include methyl acrylate, ethyl acrylate, butyl acrylate, methyl methacrylate, ethyl methacrylate, ethyl ethacrylate, etc.

The alpha, beta-unsaturated dicarboxylic acid reagents are described above and include maleic anhydride and maleimide derivative compound. The maleic anhydride and maleimide derivative compounds may generally be represented by the formula

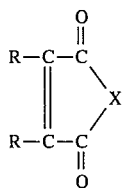

wherein each R group is hydrogen or an aliphatic or aromatic hydrocarbyl group or the two R groups are joined together to form a fused ring derivative, X is —O— or >NP$^2$ where R$_2$ is a hydrocarbyl group which may be an aliphatic or an aromatic hydrocarbyl group such as phenyl, methyl, ethyl, propyl, butyl, etc. Preferably both R groups are hydrogen.

Examples of maleic derivatives which are cyclic or bicyclic compounds include Diels-Alder reaction products of butadiene with maleic arthydride or a maleimide; Diels-Alder reaction products of cyclopentadiene with maleic anhydride or maleimide; and Diels-Alder reaction products of isoprene with maleic anhydride or an N-substituted maleimide. These cyclic or bicyclic derivatives have high glass transition temperatures.

Copolymers comprising a vinyl aromatic compound and metal salts of maleic acid also are useful in the blended polymer compositions of the present invention. The metals present in the metal salt of maleic acid may be Group I metals, Group II metals or transition metals. Alkali metals and transition metals are preferred. Partial esters of the unsaturated anhydrides also can be used. These can be obtained, for example, by reacting or esterifying, maleic acid or maleic anhydride with less than one equivalent of an alcohol such as methanol, ethanol, propanol, etc.

Other vinyl monomers which can be used to form the copolymers and terpolymers (i) include vinyl acetate, vinyl methyl ether, vinyl ethyl ether, vinyl chloride, isobutene, etc. The vinyl aromatic compounds also can be polymerized with dienes such as butadiene. SBR is a commercially available copolymer of styrenebutadiene.

The copolymers of the vinyl aromatic compounds with maleic anhydride, N-substituted maleimides or metal salts of maleic acid are obtained, in one embodiment, by polymerizing equimolar amounts of styrene and the co-reactant, with or without one or more interpolymerizable comonomers. In another embodiment, substantially homogeneous copolymers of styrene with maleic anhydride or maleimide or metal salts of maleic acid can be obtained by (1) heating a vinyl aromatic compound to a temperature at which the vinyl aromatic compound will polymerize, (2) stirring the polymerizing vinyl aromatic compound while (3) adding maleic anhydride, maleimide, or the metal salt of maleic acid, or mixtures thereof at a continuous and uniform rate. Generally, the addition of the maleic anhydride, maleimide, or metal salts or esters of maleic acid is made at a rate in moles per unit time that is slower than the rate, in moles per unit time at which the vinyl aromatic compound is polymerizing. Procedures for preparing such copolymers are known in the art and have been described in, for example, U.S. Pat. No. 2,971,939.

In one embodiment, the styrene-maleic anhydride copolymers are preferred polymers in the blended polymer compositions of the present invention. The styrene-maleic anhydride copolymers (SMA) are available commercially from, for example, ARCO under the general trade designation DYLARK. Examples include: DYLARK DBK-290 reported to comprise about 18% by weight of maleic anhydride and about 82% by weight of styrene; DYLARK 332 reported to comprise about 14% by weight of maleic anhydride and 86% by weight of styrene; and DYLARK 134 reported to comprise about 17% by weight of maleic anhydride, the balance being styrene.

Other DYLARK materials available include transparent grades: DYLARK 132 (Vicar 109° C.), DYLARK 232 (Vicar 123° C.), and DYLARK 332 (Vicat 130° C.). Impact grades include DYLARKS 150, 250, 350 and 700 which are believed to be blends and/or grafts of SMA with SBR.

Other examples of impact modified styrenic and alpha-methyl styrene copolymers with maleic anhydride and acrylonitrile include ARVYL 300 MR and 300 CR.

Low molecular weight styrene-maleic anhydride copolymers (Mw as low as 1500) also are useful and these are available commercially such as from Monsanto under the designation "SCRIPSET" and from Atochem under the designation "SMA Resins". Sulfonated styrene-maleic anhydride copolymers (and their metal salts) also are available and useful in this invention. Two such products are available from Atochem:SSMA-1000 which is a sulfonated copolymer of about 50% styrene and 50% maleic anhydride; and SSMA 3000, a sulfonated SMA comprising about 75% styrene and 25% maleic anhydride.

Specific examples of copolymers of vinyl aromatic compounds include: styrene-acrylonitrile (SAN); styrene-acrylic acid; styrene methacrylic acid; styrenebutadiene; styrene-isoprene; and the hydrogenated versions of styrene-butadiene and styrene isoprene copolymers. The copolymers may be of the grafted or block types.

Terpolymers useful in this invention include: acrylonitrile-chlorinated polyethylene-styrene (ACS); acrylic-styrene-acrylonitrile (ASA); acrylonitrile-butadiene-styrene (ABS); EPDM; grafted SAN; and styrene-methyl methacrylate-maleic anhydride; etc. Graft polymers include ABS polymers such as Lustran (Monsanto), Cycolac (G.E.), Magnum (Dow), and HIPS polymers available from many companies such as Amoco, Chevron, Dow, Mobil, Polysar, etc.

In one embodiment, the polymers comprise about 45% to about 83% (preferably about 50%, or about 60% to about 75%) by weight of the vinyl aromatic monomer, from about 15% to about 35% (preferably about 20–30%) by weight of an unsaturated dicarboxylic acid anhydride and from 2% to about 20% (preferably about 4–10%) by weight of a $C_{1-3}$ alkyl methacrylate ester. Terpolymers of this type are available commercially from Monsanto.

In one embodiment, the polymer (i) of the vinyl aromatic compound is a terpolymer of a vinyl aromatic compound, a conjugated diene and an acrylic ester. The vinyl aromatic compound, conjugated diene and acrylic esters have been described above. In a preferred embodiment, the terpolymer is a methylmethacrylate, butadiene, and styrene terpolymer.

An example of this polymer is ZYLAR® 90 methyl methacrylate-butadiene-styrene terpolymer available commercially from Novacor Chemical Ltd.

Polymers of alpha-olefins

In another embodiment, the polymer articles may be prepared using a polymer composition which contains (ii) at least one co-, or terpolymer of an alpha-olefin and at least one monomer selected from the group consisting of an acrylic acid, an acrylic ester, a vinyl silane, and a vinyl alcohol. The interpolymer may be a copolymer or a terpolymer. The acrylic acids, acrylic esters are also described above.

The alpha-olefins or 1-olefins may contain from 2 to about 20 or to about 6 carbon atoms. Alpha-olefins include ethylene, propylene, 1-butene, 1-pentene, 4-methyl-1-pentene, 1-octene, 1-decene, 4-ethyl-1-hexene, etc, or mixtures of two or more of these olefins. In one preferred embodiment, the alpha-olefins contain from 2 to about 6 carbon atoms, and more preferably, the alpha-olefin is ethylene, propylene or a mixture of ethylene and propylene.

In one embodiment, the co-, or terpolymer (ii) is a copolymer of an alpha-olefin and an acrylic acid. Examples of these polymers include ethylene-methacrylic acid or ethylene-acrylic acid copolymers. A particularly useful copolymer is an ethylene-methacrylic acid copolymer sold under the tradename NUCREL® resin available commercially from Dupont Company. A particularly useful NUCREL® resin is NUCREL® 403 resin.

In another embodiment, the co-, or terpolymer (ii) is a copolymer of an alpha-olefin and an acrylic ester. The copolymer may comprise from about 40 to about 95% by weight of the alpha-olefin and from about 5 to about 60% by weight of the carboxylic acid ester. In another embodiment the copolymer contains from about 15 to 25% by weight of the carboxylic ester and about 75% to about 85% of ethylene. The copolymers can be prepared by procedures well known to those skilled in the polymer art, and such elastomers are available commercially. Examples of specific copolymers include ethylene methyl acrylate copolymers (EMAC) such as those commercially available from Chevron under the designations SP2205, SP2255 and SP2260 having methyl acrylate contents of 20%, 18% and 24% by weight, respectively; from Exxon under the general trade designations "Escor" and available in commercial grades designated, e.g., TC110 and TC112 containing 20% and 18% methyl acrylate, respectively. Developmental Escor grade copolymers are also available from Exxon containing from 6% by weight of methyl acrylate (XS 11.04) to 28% by weight of methyl acrylate (XS 21.04 and 55.48). Lotryl 3610 is an ethylene-methyl acrylate copolymer having a methyl acrylate content of 29% by weight and is available from Atochem, Inc. Some developmental EMAC are also available from Chevron under trade designations such as TD1956, TS1967, and TD1972, and these contain 6%, 35%, 42% and 60% by weight of methyl acrylate, respectively.

Also useful are ethylene ethyl acrylates (EEA) such as those available from Union Carbide under the Bakelite designations DPD-6182, DPD-6169 and DPDA 9169. EBAs (ethylene butyl acrylates) are available from Atochem, Inc. under designations such as 17BG04 (15–18% ester content) and 30BA02 (28–32% ester content).

A particularly useful ethylene acrylic ester copolymer is an ethylenemethacrylic acid ester available commercially under the tradename PRIMACOR® from Dow Chemical Company. A particularly useful PRIMACOR® resin is PRIMACOR® 5981. Another useful alpha-olefin acrylic acid copolymer is an ethylene methylacrylate copolymer sold under the tradename VAMAC® ethylene/acrylic elastomers available commercially from DuPont Company. A particularly useful VAMAC® resin is VAMAC® G elastomer.

In another embodiment, the co-, or terpolymer (ii) is a terpolymer of an olefin, acrylic ester and either a dicarboxylic acid or a glycidyl acrylate. In one embodiment, the terpolymer will comprise from about 60% to about 94% by weight of the olefin, from about 5% to about 40% by weight of the acrylic ester, and from about 1% to about 10% of the dicarboxylic acid or glycidyl acrylate. The olefins and acrylic esters are described above.

The third component utilized in the preparation of the terpolymers may be at least one alpha,beta-olefinically unsaturated dicarboxylic acid reagent. The dicarboxylic acid reagents include the dicarboxylic acids, anhydrides, partial esters, imides, metal salts, etc., and any of the carboxylic acid reagents described above. In one embodiment, the preferred dicarboxylic acid reagent is maleic anhydride.

The third monomer used in the preparation of terpolymer may be a glycidyl acrylate, such as represented by the formula

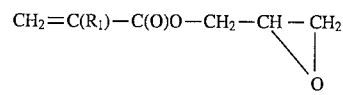

wherein $R_1$ is hydrogen or a lower alkyl group of 1 to 6 carbon atoms. Preferably $R_1$ is hydrogen or a methyl or ethyl group.

Specific examples of monomer mixtures which can be utilized to form terpolymers useful in the present invention include ethylene-methyl acrylate-maleic anhydride; ethylene-ethyl acrylate-maleic anhydride; ethylene-butyl acrylate-maleic anhydride; propylene-methyl acrylate-maleic anhydride; propylene-ethyl acrylate-maleic anhydride; ethylene-methyl acrylate-glycidyl methacrylate; ethylenemethyl acrylate-glycidyl acrylate; etc.

The terpolymers which are useful in the polymer composition of the present invention can be prepared by known techniques, and some are available commercially. For example, CdF Chimie offers a number of such terpolymers under the general trade designation Lotader™. Specific examples include Lotader™ 3200 (formerly LX4110) prepared from a mixture comprising about 88% by weight of ethylene, 9% by weight of butyl acrylate and 3% of maleic anhydride. This terpolymer has a melt index of 5 and an acid index is determined by titration of 19 mg KOH/g, a melting point of 107° C. Lotader™ 6600 comprises about 70% of ethylene, 27% of an acrylic ester and about 3% maleic anhydride. This terpolymer has an acid index of 17 mg KOH/g. Lotader™ 4700 which comprises about 62.5% ethylene, 32% of an acrylic ester and about 1.5% of maleic anhydride has a melt index of about 40, a melting point of 70° C. and an acid index of 17 mg KOH/g. Lotader™ AH8660 is a terpolymer of ethylene, an acrylic ester, and glycidyl methacrylate with a melting point of 79° C. and a vicar softening point (ASTM D1525, 1KG) of 34° C. Additional examples of terpolymers include terpolymers comprising: 77% ethylene/20% ethyl acrylate/3% maleic anhydride; 89.5% ethylene, 7% ethyl acrylate and 3.5% maleic anhydride; and 70% ethylene/28.5% ethyl acrylate/ and 1.5% maleic anhydride.

In one embodiment, the alpha-olefins contain from 2 to about 6 carbon atoms and more preferably, the alpha-olefin is ethylene, propylene or a mixture of ethylene and propylene. Specific examples of esters characterized by the above formula which are useful include methyl acrylate, ethyl acrylate, butyl acrylate, methyl methacrylate, ethyl methacrylate, ethyl ethacrylate, etc. A preferred ester is methyl acrylate.

In another embodiment, the co-, or terpolymer (ii) is an ethylene-vinyl silane copolymer. Ethylene-vinyl silane copolymers are prepared by direct polymerization of ethylene and vinyl silane. The copolymers are typically random copolymers. An example of useful ethylene-vinyl silane copolymer is AQUA-LINK® AT910 available commercially from AT Plastics, Inc.

In another embodiment, the co-, or terpolymer (ii) is an ethylene-vinyl alcohol copolymer. Ethylene-vinyl alcohol copolymers are available commercially from Eval Company of America under the tradename of EVAL® ethylene-vinyl alcohol copolymer resins. A particularly useful resin is EVAL® L-101.

Polyolefins

In another embodiment, the polymer articles used in the present invention may be prepared from polymer compositions containing (iii) at least one polyolefin other than a propylene homopolymer or polypropylene ethylene copolymer. The olefins are typically alpha-olefins as those described above. Preferably, the olefins contain from 2 to about 8 carbon atoms and include ethylene, propylene, and butylene. In one embodiment, the polyolefin (iii) is a polybutene. As used herein, polybutenes include homopolymers of isobutylene, as well as interpolymers of isobutylene and butene. A particularly useful polybutene is available commercially from Amoco under the tradename AMOCO® L-14 polybutene.

In another embodiment, the polyolefin may be copolymers of ethylene with other olefins such as butenes, hexenes and octenes. An example of a useful polyolefin copolymer is Flexamer™ polyolefins available commercially from Union Carbide Chemical Company. A particularly useful Flexamer™ polyolefin is DFD-1085NT. Another useful polyolefin is Exact™ plastomers available from Exxon Chemical. A particularly useful Exact™ plastomers are M-0122 and M-0125.

(iv) Polyetheramide Block Copolymers

The polymer compositions of the present invention may include (iv) a polyetheramide block copolymer. They are produced by polycondensation reaction of a polyether diol (PE) and of a dicarboxyic polyamide (PA). The combination of flexible polyether block with a rigid polyamide block yields a block copolymer with the generic formula:

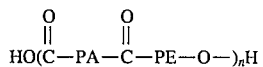

wherein n is a positive integer, PA is a dicarboxylic polyamide and PE is a polyether. ATOCHEM offers a number of such block copolymers under the general trade designation PEBAX®. Specific grades include PEBAX® 6312. PEBAX® 3533 has various hardness values.

(v) Ionomers

Ionomers are polymers which contain inorganic salt groups attached to the polymer chain. Generally, ionomers contain the maximum of about 10 mole percent ionic groups pendant to a hydrocarbon polymer chain. The ionic groups are typically carboxylic salts or sulfonic salt groups. Examples of ionomers include copolymers of olefins, such as ethylene and propylene with unsaturated carboxylic acids such as acrylic acid, methacrylic acid and crotonic acid, preferably methacrylic acid. A particularly useful example of ionomers are ethylene-methacrylic acid ionomers such as those available commercially under the tradename SURLYN® ionomer resins available from DuPont Company. A particularly useful SURLYN® ionomer resin is SURLYN® 8020.

Another example of ionomers include sulfonated olefin rubbers and resins. The resins and rubbers may be any of those described above such as ethylene-propylene-diene terpolymers, polystyrene and styrene-butadiene, or styrene-isoprene copolymers. The rubbers and resins are sulfonated by reacting a sulfonation reagent with unsaturation in the polymer as is known to those in the art.

(vi) Oxidized Polyolefin Wax

In another embodiment, the polymer articles of the present invention are prepared from a polymer composition containing an oxidized polyolefin wax. Polyolefins may be derived from any olefin, preferably an alpha-olefin. The olefins generally contain from 2 to about 8 carbon atoms and include ethylene, propylene, butylene, etc. In one embodiment, the olefin is ethylene and the polyolefin wax is a polyethylene wax. The molecular weight of the polyethylene wax is generally less than 10,000. The polyolefin waxes are made by means known to those in the art. Oxidized polyethylene waxes are available commercially from Allied Chemical Company under the trade designations A-C 629, 629A, 655, 656, and 680.

(D) Other Components

It is within the scope of the invention to optionally include in the polymer composition one or more antioxidants compatible with the polymer composition. In general, the blended polymer compositions of the present invention will optionally contain from 0.05% to about 0.3% by weight of a polyolefin compatible antioxidant (D), and most often about 0.2% of component (D).

Antioxidants for polyolefin blends are well known. For example, hindered phenolic antioxidants are particularly effective in preventing deterioration of physical properties during the preparation of polyblends and in extending the useful life of the end product. The hindered phenols suitable in the context of the present invention conform structurally to:

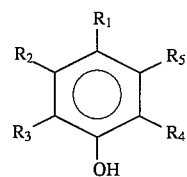

wherein $R_1$, $R_2$ and $R_3$ independently are a hydrogen atom or an alkyl group, $R_3$ and $R_4$ independently are alkyl groups containing at least 4 carbon atoms, preferably a $C_3$–$C_{10}$ alkyl group and more preferably a tertiary butyl group. Specific examples of such hindered phenols include butylated hydroxy toluene (BHT) and butylated hydroxy ethyl benzene (BHEB).

Other conventional polymer blend components such as colorants, antistatic agents, lubricants and inert fillers, can be added to the polymer composition provided that the added amount of these ingredients is insufficient to substantially alter the desired properties of the resulting composition.

For the preparation of blended polymer compositions according to this invention, a blending method which results in the formation of an intimate blend is employed. For example, a particularly useful procedure is to intimately mix the polymers using conventional mixing equipment such as a mill, a Banbury mixer, a Brabender Torque Rheometer, a single or twin screw extruder, continuous mixers, kneaders, etc. For example, the polymers may be intimately mixed in the form of granules and/or powder in a high shear mixer. One process for preparing the blended polymers utilizes the Farrel Continuous Mixer (FCM CP-23). Short residence times and high shear are readily obtained in a CP-23. "Intimate" mixing means that the mixture is prepared with sufficient mechanical shear and thermal energy to produce a dispersed phase which is finely divided and homogeneously dispersed in the continuous or principal phase.

In another of its aspects the present invention relates to methods for joining surfaces comprised of the polyblends of the present invention by Radio Frequency welding. Radio frequency ("RF") welding, also known as high frequency sealing, or dielectric heat sealing, has been in use for many decades to bond plastics. An RF sealer directs a large amount of electrical energy into the work area. This energy causes the molecules of the material being sealed to oscillate, creating heat. A combination of this heat and pressure exerted by the press portion of the sealer causes the material to bond. The polymer articles of the present invention are particularly suitable for the preparation of surfaces to be joined by RF welding. The articles may be used to prepare bags, pouches, closures, and other articles. Typically, frequencies from about 26 MHz to about 28 MHz are employed. Most often, radio frequencies of about 27./±0.26 MHz a used. The power output of an RF sealer for use in the present method is typically from about 5 KW to about 15 KW.

For example, the polymer articles of the present invention may be RF welded by placing them in a 10 KW RF welding machine having a 5" by 7" notebook tool constructed from a brass rule kit. The process involves bringing an upper platen to a lower stationary platen with the polymer articles between the platens. A mylar buffer is used to prevent the die (electrode) from contacting the lower stationary platen. Heat is generated in platens and presealed time begins. Presealed time is the time between the upper platen clamping and the RF current start. After sealed time the power source generates RF current, for an amount of time used to heat and melt the material to be welded. After sealing, the sealed article is cooled. As example, the pressure is generally from about 60 to 80 psi, the presealed time is from 0.5 to about 2 seconds, preferably 1 second, the sealed time is from 3 to about 6 seconds, and cooling time is about 0.5 to about 3 seconds. The power setting of the RF welding equipment is approximately 50%.

Various features and aspects of the present invention are illustrated further in the examples that follow. While these examples are presented to show one skilled in the art how to operate within the scope of this invention, the examples are not to serve as a limitation on the scope of the invention since such scope is only defined in the claims.

Unless otherwise indicated in the following examples and elsewhere in the specification and claims, all parts and percentages are by weight, temperatures are in degrees Centigrade, and pressures are at or near atmospheric.

In the following examples, the polymer compositions are pre-compounded in a 1.5" single screw extruder from Killion (L/D=24:1). The temperature profile is set between 120° C. to about 230° C. The screws speed is set at 100 RPM. Material is gravity fed and a strand die is used. The strands are cooled downstream in a cool water bath (10 feet long) followed by drying.

The polymer articles of the present invention are generally prepared in a 2.5" single screw extruder (L/D=24:1) from NRM. The pre-compounded pellets are gravity fed into the extruder and the temperature profile is set between 135° C. to 235° C. The extruder is set to 50–75 amps. The polymer composition is extruded through a slot die. The polymer film is quickly cooled by passing it through a downstream water bath (25 to 30 feet long, cold water circulated constantly). The polymer article may be prepared by cast film or blown film extrusion techniques known to those in the art.

TABLE 1

| Material Description | Control | Ex-1 | Ex-2 | Ex-3 | Ex-4 | Ex-5 | Ex-6 | Ex-7 | Ex-8 |
|---|---|---|---|---|---|---|---|---|---|
| Shell WRD6-281 | 34.9 | 24.9 | 24.9 | 24.9 | 24.9 | 24.9 | 24.9 | 24.9 | 24.9 |
| Exxon LD720.62 | 65 | 65 | 65 | 65 | 65 | 65 | 65 | 65 | 65 |
| Ethyl Ethanox 330 | 0.1 | 0.1 | 0.1 | 0.1 | 0.1 | 0.1 | 0.1 | 0.1 | 0.1 |
| Shell-KRATON ® G1652 | — | 10 | — | — | — | — | — | — | — |
| Shell KRATON ® FG1901X | — | — | 10 | — | — | — | — | — | — |
| Atochem LOTADAER ® 3210 | — | — | — | 10 | — | — | — | — | — |
| Atochem LOTADER ® 8651 | — | — | — | — | 10 | — | — | — | — |
| Chevron SP2205 | — | — | — | — | — | 10 | — | — | — |
| Novacor ZYLAR ® 90 | — | — | — | — | — | — | 10 | — | — |
| Atochem PEBAX ® 6312 | — | — | — | — | — | — | — | 10 | — |
| Dupont SURLYN ® 8020 | — | — | — | — | — | — | — | — | 10 |

| Material Description | Control | Ex-9 | Ex-10 | Ex-11 | Ex-12 | Ex-13 | Ex-14 | Ex-15 | Ex-16 |
|---|---|---|---|---|---|---|---|---|---|
| Shell WRD6-281 | 34.9 | 24.9 | 24.9 | 24.9 | 24.9 | 24.9 | 24.9 | 24.9 | 24.9 |
| Exxon LD720.62 | 65 | 65 | 65 | 65 | 65 | 65 | 65 | 65 | 65 |
| Ethyl Ethanox 330 | 0.1 | 0.1 | 0.1 | 0.1 | 0.1 | 0.1 | 0.1 | 0.1 | 0.1 |
| Allied AC330 | — | 10 | — | — | — | — | — | — | — |
| DuPont Nucrel 403 | — | — | 10 | — | — | — | — | — | — |
| Shell KRATON ® RP6501 | — | — | — | 10 | — | — | — | — | — |
| EVAL L101 | — | — | — | — | 10 | — | — | — | — |
| Dow PRIMACOR ® 5981 | — | — | — | — | — | 10 | — | — | — |
| DuPont VAMAC ®-G | — | — | — | — | — | — | 10 | — | — |
| AT Plastics 910 | — | — | — | — | — | — | — | 10 | — |
| Exxon Exact Plastomer M-0122 | — | — | — | — | — | — | — | — | 10 |

TABLE 1-continued

| Material Description | Control | Ex-17 | Ex-18 | Ex-19 | Ex-20 |
|---|---|---|---|---|---|
| Shell WRD6-281 | 34.9 | 24.9 | 24.9 | 34.5 | 24.9 |
| Exxon LD720.62 | 65 | 65 | 65 | 65 | 64.5 |
| Ethyl Ethanox 330 | 0.1 | 0.1 | 0.1 | 0.1 | 0.1 |
| Union Carbide Fleximer ™ DFDA-1085 NT | — | 10 | — | — | — |
| Amoco Polybutene L-14 | — | — | 10 | — | 10 |
| Polyvel Peroxide Conc. CR-05 | — | — | — | 0.5 | 0.5 |

TABLE 2

| | A | B | C | D | E | F |
|---|---|---|---|---|---|---|
| Elvax 3165 | 60 | 65 | 55 | 60 | 65 | 65 |
| Soltex 4208 | 30 | 28 | 35 | 30 | 28 | 25 |
| LOTADER ® LX3200 | 10 | — | — | — | — | — |
| KRATON ® FP6501 | — | 7 | — | — | — | — |
| KRATON ® FG1901X | — | — | 10 | — | — | — |
| DLYLARK ® 350 | — | — | — | 10 | — | — |
| PEBAX ® 3533 | — | — | — | — | 7 | — |
| ZYLAR ® 90 | — | — | — | — | — | 8 |

| | G | H | I | J |
|---|---|---|---|---|
| Elvax 3165 | 65 | 55 | 58 | 59 |
| Soltex 4208 | 33 | 35 | 32 | 31 |
| SURLYN ® 8020 | 12 | — | — | — |
| VAMAC ®-G | — | 10 | — | — |
| LOTADER ® 8651 | — | — | 10 | — |
| Oxidized Wax | — | — | — | 10 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. An article prepared by the process comprising the steps of:
   (I) preparing a polymer composition by blending
   (A) at least one ethylene vinyl acetate copolymer,
   (B) at least one propylene homopolymer or at least one propylene ethylene copolymer, and
   (C) from about 0.1% to about 35% by weight of one or more polymers selected from the group consisting of:
      (i) at least one copolymer of at least one vinyl aromatic compound and a conjugated diene; and
      (ii) at least one co-, or terpolymer of an alpha-olefin, and at least one monomer selected from the group consisting of an acrylic acid, an acrylic ester and mixtures thereof; and
   (II) forming the polymer composition into the article, wherein the article is halogen free.

2. The article of claim 1 wherein (B) is a random copolymer of propylene and ethylene.

3. The article of claim 1 wherein the co-, or terpolymer (i) is at least one hydrogenated block copolymer of a vinyl aromatic hydrocarbon and a conjugated diene, or at least one hydrogenated block copolymer of a vinyl aromatic hydrocarbon and a conjugated diene to which has been grafted with an alpha, beta-olefinically unsaturated monocarboxylic or dicarboxylic acid reagent.

4. The article of claim 3 wherein the block copolymers prior to hydrogenation, are each independently styrene-butadiene-styrene block copolymers.

5. The article of claim 3 wherein the hydrogenated block copolymers are each independently hydrogenated block copolymers of the formula $$B_n(AB)_oA_p$$

wherein n=0 or 1; o=1 to 100; p=0 or 1;
   each B prior to hydrogenation is a polymerized conjugated diene hydrocarbon block having a number average molecular weight of about 20,000 to about 450,000; and
   each A is a polymerized monoalkenyl aromatic hydrocarbon block having a number average molecular weight of about 2000 to about 115,000; the blocks of A constituting about 5% to about 95% by weight of the copolymer; and the unsaturation of the block B is less than about 10% of the original unsaturation.

6. The article composition of claim 1 wherein the alpha-olefin of (ii) contains from 2 to about 6 carbon atoms.

7. The article composition of claim 1 wherein the alpha-olefin of (ii) is ethylene, propylene or a mixture thereof.

8. The article of claim 1 wherein the acrylic acid and acrylic ester of (ii) is characterized by the formula $$CH_2\!\!=\!\!C(R)COOR'$$

wherein R is hydrogen, or a methyl or ethyl group, and R' is an alkyl group containing 1 to about 6 carbon atoms.

9. The article of claim 1 wherein the co-, or terpolymer (ii) is an ethylene-methyl acrylate copolymer.

10. The article of claim 1 wherein the article is a monolayer article.

11. The article of claim 1, wherein the propylene homopolymer or propylene-ethylene copolymer are present in an amount from about 15% to about 60% by weight.

12. A method of joining polymer articles comprising the steps of:
   (1) contacting two or more monolayer polymer articles prepared by the process comprising the steps of:
      (I) preparing at least one polymer composition by blending
      (A) at least one ethylene vinyl acetate copolymer,
      (B) at least one propylene homopolymer or at least one propylene ethylene copolymer, and
      (C) from about 0.1% to about 35% by weight of one or more polymers selected from the group consisting of:
         (i) at least one copolymer of at least one vinyl aromatic compound and a conjugated diene; and
         (ii) at least one co-, or terpolymer of an alpha-olefin, and at least one monomer selected from the group consisting of an acrylic acid, an acrylic ester and mixtures thereof;

(II) forming the polymer composition into two or more articles, wherein the articles are halogen free; and (2) joining the articles by radio frequency welding.

13. An article prepared by the process comprising (1) contacting two or more monolayer polymer articles prepared by the process comprising the steps of:

(I) preparing at least one polymer composition by blending (A) at least one ethylene vinyl acetate copolymer, (B) at least one propylene homopolymer or at least one propylene ethylene copolymer, and (C) from about 0.1% to about 35% by weight of one or more polymers selected from the group consisting of:

(i) at least one copolymer of at least one vinyl aromatic compound and a conjugated diene; and (ii) at least one co-, or terpolymer of an alpha-olefin, and at least one monomer selected from the group consisting of an acrylic acid, an acrylic ester and mixtures thereof;

(II) forming the polymer composition into two or more articles, wherein the articles are halogen free; and (2) joining the polymer articles by radio frequency welding.

14. The article of claim 13 wherein the article is a bag or pouch.

15. An article comprising two monolayer polymer films joined by radio frequency welding to form a bag or pouch wherein the monolayer polymer films comprise a halogen free blend of (A) at least one ethylene vinyl acetate copolymer, (B) at least one propylene homopolymer or at least one propylene ethylene copolymer, and (C) from about 0.1% to about 35% by weight of one or more polymers selected from the group consisting of:

(i) at least one copolymer of at least one vinyl aromatic compound and a conjugated diene; and (ii) at least one co-, or terpolymer of an alpha-olefin, and at least one monomer selected from the group consisting of an acrylic acid, an acrylic ester and mixtures thereof.

* * * * *